Jan. 5, 1965     D. C. BENNETT     3,164,018
FLOW-METER

Filed March 14, 1962                                    2 Sheets-Sheet 1

DONALD C. BENNETT
    INVENTOR.

BY
Watson, Cole, Grindle &
    Watson

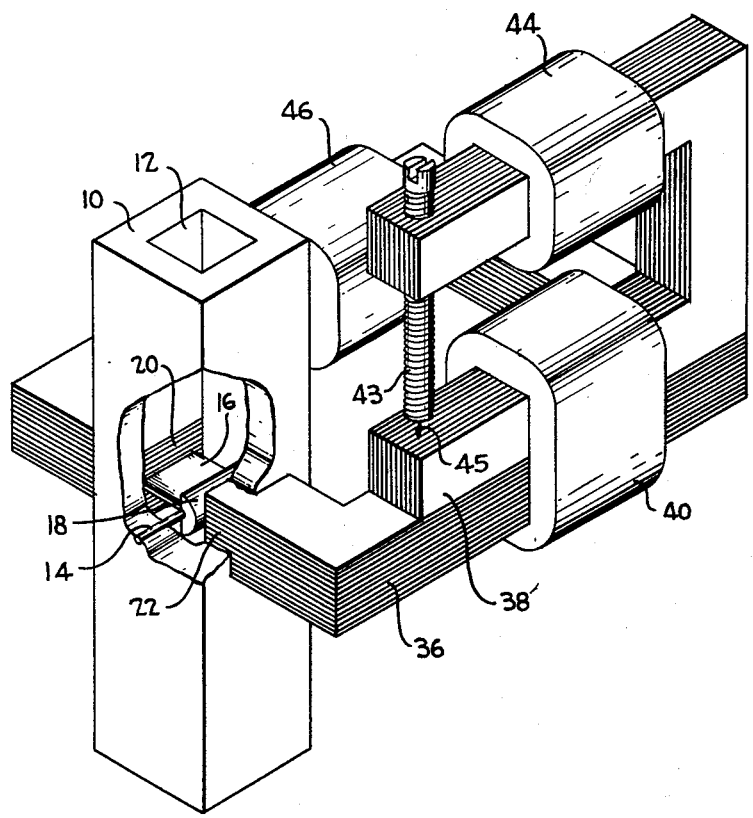

United States Patent Office

3,164,018
Patented Jan. 5, 1965

3,164,018
FLOW-METER
Donald C. Bennett, 7 Sullivan Way, East Brunswick, N.J.
Filed Mar. 14, 1962, Ser. No. 179,654
12 Claims. (Cl. 73—228)

This invention relates to flow meters and, more particularly, ot an improved electrical flow meter.

Priorly, numerous forms of electrical flow meters have been employed to deliver an electrical indication which is indicative of the quantity of fluid flowing through the meter. For example, magnets have been mounted on vanes which are located in the path of the fluid flow and the vanes mechanically biased by means of a spring. The magnet is magnetically coupled to a coil external to the fluid conduit, which coil delivers an electrical signal indicative of the position of the vane and thus indicative of the rate of fluid flow. All of these prior art devices, however, exhibit certain disadvantages. For example, they include no provision for reading different orders of magnitudes of fluid flow rates. Since the spring employed to restore the vane to its initial position acts in accordance with Hooke's Law within its modulus of elasticity, the meter is incapable of indicating fluid flow rates beyond a predetermined elastic limit of the spring. I have discovered, however, an improved flow meter which can be eradily employed for different ranges of fluid flow rates.

Accordingly, it is an object of this invention to provide an improved electrical flow meter.

It is another object of this invention to provide an improved electrical flow meter which is readily converted to read different ranges of fluid flow without mechanical modification of the meter.

It is another object of this invention to provide an improved electrical flow meter which is simple in construction and mode of operation and, therefore, economical to produce and maintain.

Briefly, in accordance with aspects of this invention, a vane including a ferromagnetic body of low coercive force is attached for rotation about a shaft in a fluid conduit. The shaft is connected to the vane at a finite distance from the center of pressure of the vane. Advantageously, the vane assembly has a counter-weight to locate the center of gravity on the axis of rotation. Also advantageously, an electromagnetic field is produced in a direction perpendicular to the direciton of fluid flow and parallel to the normal position of the vane to act as a restoring torque to oppose the torque produced by the moving fluid. The angular position of vane relative to the electromagnetic field is indicative of the rate of fluid flow, which position determines the magnetic reluctance of the magnetic circuit. The magnetic reluctance of the magnetic circuit can be accurately determined by applying a constant alternating current potential to the electromagnetic and measuring the magnetic reluctance through the electromagnet core. A first coil may be mounted on one leng of the core and a secondary coil mounted on another leg of the magnetic core and connected to a meter to read the current induced in the secondary coil through the magnetic path defined by the ferromagnetic vane. Advantageously, this meter may be quickly and easily converted to read different ranges of fluid flow rates merely by changing the current through the primary winding of the electromagnetic coil, thereby changing the restoring torque applied to the ferromagnetic vane. Several different restoring torques are required to provide different flow ranges. These ranges are each selected by applying a different predetermined potenital to the primary coil.

In accordance with a further feature of this invention, a pair of ferromagnetic vanes are employed, one of which is located in the path of the fluid flow and a pair of magnetic circuits are employed, each linking one of the vanes. A single coil is employed as a primary winding to produce the electromagnetic field for both of the magnetic circuits. Individual secondary windings are mounted on the respective cores and are connected in series opposition. The second vane, which is located outside the path of fluid flow, provides a means for balancing the output of the associated secondary winding to the same value as the output of the other secondary winding when there is no fluid flow. When no fluid is flowing in the conduit, a first predetermined potential is applied to the primary coil and the second vane is manually moved to and secured in a position in which the output from both secondaries is the same. When fluid flows through the fluid conduit, however, the first vane moves and the current induced in the secondary windings is read on a single meter, which meter may be calibrated to indicate the fluid flow rate. These and various objects and features of the invention will be more clearly understood from a reading of the detailed description of the invention in conjunction with the drawing in which:

FIGURE 4 is a perspective view of the preferred embodiment of this invention.

Figure 1:
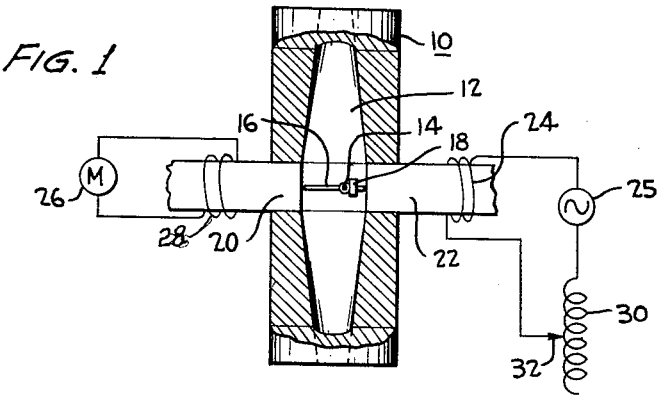
FIGURE 1 is a plan view, partly in section, of a fluid conduit and portions of one illustrattive embodiment of this invention.

Referring now to FIGURE 1, there is depicted, partly in section, a fluid conduit 10 which connects with a fluid passage 12 which is square in cross-section. Mounted in passage 12, in an off-center position, is a shaft 14. A substantially square vane 16 is rotatably mounted on the shaft 14 and a counter-weight 18 is mounted on the shorter length of vane to the right of the shaft 14, as viewed in FIGURE 1, to locate the center of gravity of the vane on its axis of rotation. Advantageously, the vane and counter-weight are of ferromagnetic material having a low coercive force. A pair of electromagnet pole pieces 20 and 22 are aligned on opposite sides of the conduit 10 with the vane and are preferably aligned in a direction perpendicular to the axis of passage 12. These electromagnet poles aid in the production of an electromagnetic field which is perpendicular to the shaft 14 and perpendicular to the direction of fluid flow, which field acts as a restoring force for the vane in a manner which will be subsequently described.

When fluid flows through the fluid passage 12, for example in a downward direction, as viewed in FIGURE 1, the left-hand portion of the vane interrupts a greater portion of the fluid flow and is therefore moved downwardly. The movement of the ferromagnetic body from its position of alignment with the electromagnetic field of pole pieces 20 and 22 results in a change of magnetic reluctance. The electromagnetic field is produced by applying an alternating current to coil 24 from generator 25. The change in magnetic reluctance due to a change in position of vane 16 will be indicated by a change in current reading at meter 26, which reads the current induced in coil 28.

Advantageously, the flow meter may be employed to measure flow rates of different orders of magnitude by changing the restoring torque which is applied to the vane. This may conveniently be done by means of an auto-transformer 30 with a variable tap 32. By moving tap 32 to a predetermined position, a predetermined potential is applied to coil 24. For each predetermined potential across coil 24, an electromagnetic restoring force is applied to vane 16.

Also advantageously, the sensitivity of the flow meter may be changed by changing the effective area of the vane 16. This may be accomplished by changing the location of the center of rotation of the vane and readjusting the counter-weight 18.

Figure 2:
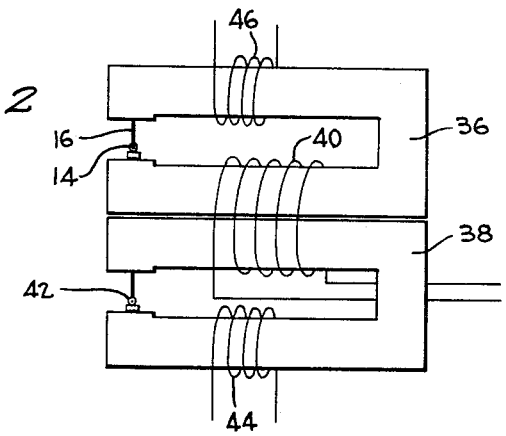
FIGURE 2 is a schematic representation of the magnetic circuits and ferromagnetic vanes of another illustrative embodiment of this invention.

Referring now to FIGURE 2, there is depicted, in schematic form, another illustrative embodiment of this invention which provides for a more precise measurement of the fluid flow rate than the embodiment of FIGURE 1. In this embodiment, magnetic cores 36 and 38 are positioned adjacent each other and a primary winding 40 encircles one leg of each of these cores and is energized by a convenient means such as a generator, not shown. In this embodiment, a first vane 16 is associated with core 36 and is positioned in the path of the fluid flow in a conduit, not shown. A second vane 42 is positioned outside the conduit and is operatively associated with electromagnetic core 38. Each of vanes 16 and 42 are of ferromagnetic material. Vane 42 can be manually rotated and fixed in any predetermined position by suitable means, not shown. The restoring force for vane 16 is determined by the current flow through coil 40. Secondary windings 44 and 46 encircle one leg of cores 38 and 36, respectively. The current induced in each secondary is indicative of the magnetic reluctance across the associated gap. Advantageously, secondary winding 46 has fewer turns than secondary 44. With this turn relationship it is possible to adjust vane 42 to balance the algebraic sum of secondary currents and thus zero the associated meter by suitably positioning vane 42.

Figure 3:
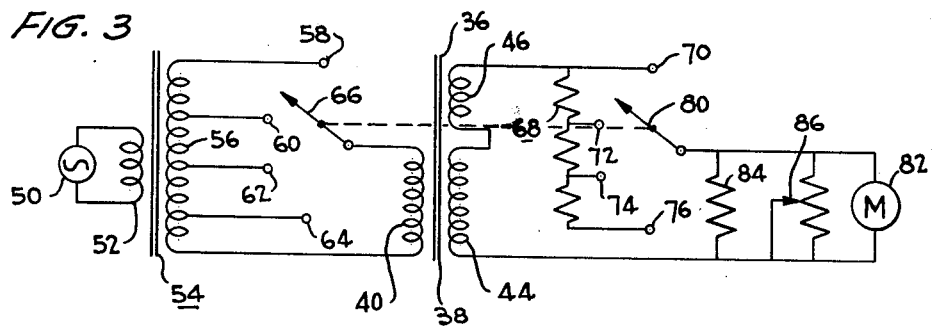
FIGURE 3 is a schmatic representation of the circuit employed with the embodiment of FIGURE 2.

The electrical circuit employed with the embodiment of FIGURE 2 is shown in FIGURE 3. A generator 50 is connected to a primary winding 52 of a transformer 54. The secondary winding 56 has a number of taps 58, 60, 62, and 64. A movable contact 66 is employed to selectively connect these contacts to the primary winding 40 which encircles one leg of each of cores 36 and 38, as shown in FIGURE 2. The secondary windings 44 and 46 are connected in opposition to compensate for currents induced in the secondary when no fluid is flowing through the conduit in which the vane 16 is located. Thus, with no fluid flow, vane 42 is manually rotated and secured in a position in which the algebraic sum of the secondary current is zero. The combination of magnetic circuits 36 and 38, vanes 16 and 42, and secondary windings 44 and 46 produces a flow meter which is more sensitive than the embodiment of FIGURE 1 because of the operation of the system.

A suitable circuit for measuring the current induced in secondary windings 44 and 46 is provided which includes a tapped resistor 68 having taps 70, 72, 74, and 76 thereon. A movable tap 80 is associated with these resistor taps to control the amount of current flow to meter 82. Advantageously, tap 80 is ganged to tap 66 so that the meter circuit will have increased resistance for higher flow rates. The meter is also provided with a fixed shunt 84 and a variable shunt 86 to control the sensitivity and accuracy of the meter in a manner well known in the art. The variable rheostat 86 provides a convenient device for calibrating the flow meter for the molecular weights and pressures of different fluids. For example, a gas would require a calibration different from a liquid. Similarly, different molecular weights of gases would require different calibrations.

Assume for the purpose of discussion of the operation of device that vane 42 has been adjusted for zero secondary current and fluid is flowing in the conduit causing rotation of the vane 16. When vane 16 is moved to define an angle relative to the magnetic flux, the magnetic reluctance in the circuit of core 36 is increased and the flux linking primary winding 40 with secondary winding 46 is decreased. This results in a decrease in the current induced in coil 46. The reduction in flux in the core 36 reduces the inductive reactance reflected in the primary winding 40. As a result of the decreased reactance, the current through winding 40 increases, the flux through magnetic core 38 increases, causing a greater current to be induced in winding 44. Since the windings 44 and 46 are connected in opposition, the algebraic total current flowing in these windings indicates a greater change than would be indicated in secondary winding 46 when operated in a manner shown in FIGURE 1. The movable tap 66 may be employed to change the restoring force applied to the vane 16 to thus permit the flow meter to indicate different ranges of flow rate.

FIGURE 4 shows another illustrative embodiment of this invention in which a different type of zero flow compensation is employed. A first electromagnetic core 36 is positioned with its poles 20 and 22 facing the vane 16. The second electromagnet core 38' is positioned to be magnetically coupled to core 36. A set screw 43 threadably engages core 38' and may be employed to adjust the air gap 45 which completes the flux path for core 38'. Because the circuit employed with the embodiment of FIGURE 4 is the same as that shown in FIGURE 3, only the operation of the zero adjustment will be explained. With no fluid flow in passage 12 and a predetermined potential applied to primary coil 40, the adjusting screw 43 is rotated until the algebraic sum of the secondary current through secondary windings 44, 46 is zero. This adjustment is one in which the reluctance of core 38' is adjusted until the current induced into the secondaries is equal and opposite (because of the manner in which they are connected).

In view of the foregoing explanation, it will be apparent that this flow meter exhibits numerous advantages. For example, this flow meter can be readily converted to read various ranges of flow rates merely by increasing the restoring torque applied to the vanes by increasing the current through the primary electromagnet winding. The meter will operate in any position and measure fluid flow in either direction through the conduit in which the vane is located. The meter will operate even when subjected to shock and vibration and, finally, the meter can be read at a point remote from the fluid conduit without the necessity for mechanical connections between the interior and exterior of the conduit, thus permitting the metering of fluids without incurring the problems of leakage normally present in mechanically connected meters.

While I have shown and described certain illustrative embodiments of this invention, it is understood that the concepts thereof may be applied to various other embodiments without departing from the spirit and scope of this invention.

What is claimed is:

1. A device or measuring fluid flow comprising a conduit having a fluid passage therein and through which fluid flows, a ferromagnetic vane rotatably mounted in said conduit, electromagnetic means coupled to said vane for producing a restoring force on said vane, and means coupled to said electromagnetic means for indicating the reluctance of the magnetic path around said vane, said last mentioned means including means for indicating the rate of fluid flow.

2. A device according to claim 1 wherein said electromagnetic means comprises a pole piece positioned adjacent said conduit, a coil operatively associated with said pole piece, and means for supplying an alternating electrical current to said coil.

3. A device according to claim 2 further comprising means for varying the current to said coil thereby varying the restoring force applied to said vane whereby said meter may be employed to read different ranges of fluid flow rates.

4. A flow meter comprising a conduit having a fluid passage therein, a core having a gap therein, said conduit being located in said gap, a ferromagnetic vane rotatably mounted in said conduit within said gap, a first coil operatively associated with said core, a source of alternating electromotive force connected to said first coil, a second coil operatively associated with said magnetic core and meter means for determining the amount of current induced in said second coil from said first coil, whereby said meter means indicates the magnetic reluctance across said gap and thereby indicates the rate of fluid flow in said conduit.

5. The device according to claim 4 further comprising means for varying the current through said first coil whereby said meter may be readily converted to read different ranges of fluid flow rates.

6. A flow meter comprising a fluid conduit, a first ferromagnetic vane rotatably mounted in said conduit, a first magnetic core having a gap therein positioned adjacent the conduit with said vane located in said gap, a second magnetic core having a gap therein and positioned remote from said conduit and coupled to said first core and having means for adjusting the reluctance of said last-mentioned gap, means for applying an alternating current field to said cores and means for determining the magnetic reluctance of said gaps.

7. The device according to claim 6 wherein said means for establishing an alternating current electromagnetic field includes a winding operatively associated with both of said cores and an alternating current source connected to said winding.

8. A device according to claim 7 wherein said means for determining the magnetic reluctance of said gaps comprises a pair of secondary windings, each operatively associated with one of said cores and meter means connected to said secondary windings to indicate the current induced in said secondary winding and thereby indicate the fluid flow rate through said conduit.

9. The device according to claim 8 wherein said secondary windings are connected in opposition and wherein said reluctance adjusting means is positioned to balance the output of the secondary windings when no fluid is flowing in said conduit.

10. The device according to claim 9 further comprising means for varying the current flow in said primary winding whereby said flow meter can be readily converted to read different ranges of fluid flow rates by changing the current flowing in said primary winding thus varying the restoring force on said vane.

11. The device according to claim 10 further comprising potentiometer means connected in parallel with said meter means for adjusting the sensitivity of said meter means thereby calibrating said meter means for different fluid molecular weights.

12. The device according to claim 11 wherein said vane has a counter-weight thereon to locate the center of gravity of the vane on the axis of rotation of the vane.

References Cited in the file of this patent
UNITED STATES PATENTS

| | | |
|---|---|---|
| 1,967,017 | Rohner | July 17, 1934 |
| 2,992,369 | Rocca | July 11, 1961 |

FOREIGN PATENTS

| | | |
|---|---|---|
| 662,353 | Great Britain | Dec. 5, 1951 |